No. 754,550. PATENTED MAR. 15, 1904.
F. W. DUNN.
MANUFACTURE OF ARTIFICIAL STONE.
APPLICATION FILED SEPT. 5, 1903.
NO MODEL. 2 SHEETS—SHEET 1.

Witnesses
W. S. Guest
W. C. Anderson

Inventor
F. W. Dunn
by C. P. Miles
his attorney

No. 754,550. PATENTED MAR. 15, 1904.
F. W. DUNN.
MANUFACTURE OF ARTIFICIAL STONE.
APPLICATION FILED SEPT. 5, 1903.
NO MODEL. 2 SHEETS—SHEET 2.
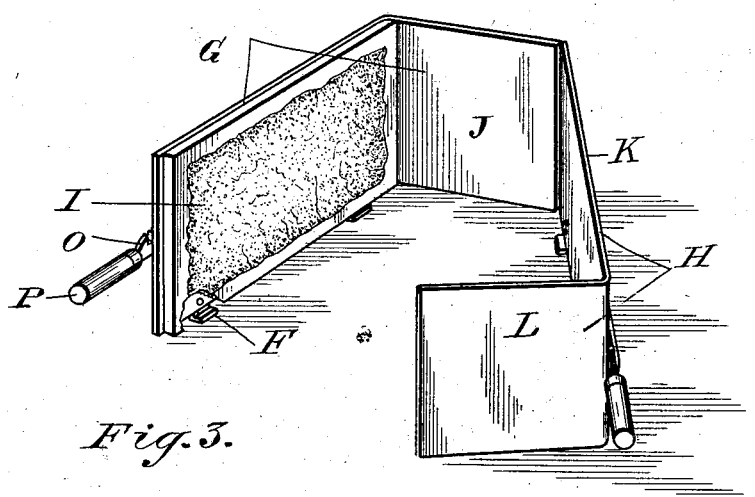
Fig. 3.
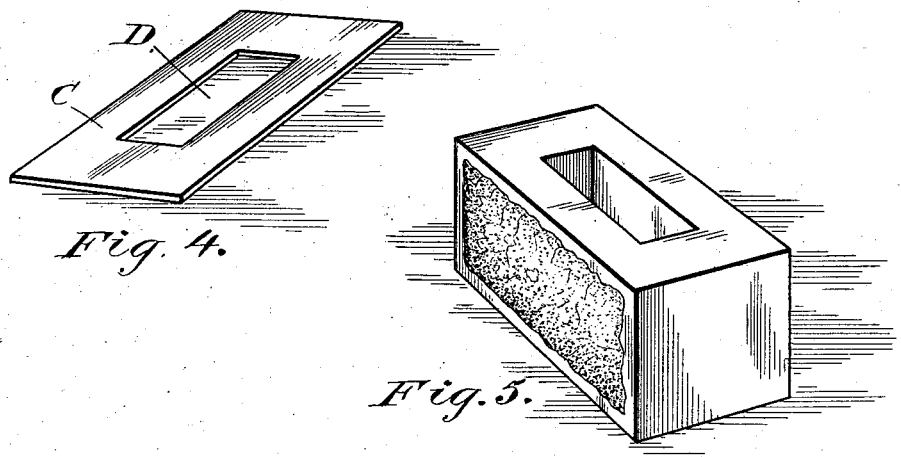
Fig. 4.
Fig. 5.
Witnesses
Inventor No. 754,550. Patented March 15, 1904.

UNITED STATES PATENT OFFICE.

FREDERICK W. DUNN, OF WOODSTOCK, CANADA, ASSIGNOR OF ONE-HALF TO NEIL McPHEDRAN, GEORGE L. WHITNEY, JACOB HENRY FRANK, AND HENRY JOHN FINKLE, OF WOODSTOCK, CANADA.

MANUFACTURE OF ARTIFICIAL STONE.

SPECIFICATION forming part of Letters Patent No. 754,550, dated March 15, 1904.

Application filed September 5, 1903. Serial No. 172,077. (No model.)

*To all whom it may concern:*

Be it known that I, FREDERICK WALKINGTON DUNN, of Woodstock, in the county of Oxford, Province of Ontario, Canada, have invented certain new and useful Improvements in an Apparatus for the Manufacture of Artificial Stone; and I hereby declare that the following is a full, clear, and exact description of the same.

My invention has reference to a novel apparatus for the shaping of artificial stone when in a powdered, granular, or semidry condition and when the articles to be produced do not require to be formed under a heavy pressure.

In the manufacture of this class of artificial stone the siliceous and cementing materials, such as sand and cement or sand and line, are combined in the proper proportions and thoroughly mixed together in their powdered or granular state in order that the particles of sand may become coated with the finer particles of cement or lime. The mixture is then slightly moistened and placed in a mold, where it is tamped into a compact homogeneous mass of the requisite density. To so construct this mold that the artificial stone can be easily and properly molded is one of the objects of the present invention, a further object of the invention being to so construct the mold that it will deliver its molded contents without shattering the fragile structure.

In carrying out the invention the bottom of the mold consists of a removable follow-board or pallet detachably connected to the drag by means of suitable clamping elements. To facilitate the delivery of the molded stone, the drag is made in sections hinged together and provided with a suitable locking element, by means of which they are rigidly held in their closed position. To these sections are secured the gripping elements for holding the removable follow-board or pallet in its proper relation to the other parts of the molding apparatus, as hereinafter more fully set forth, and more particularly pointed out in the claims.

Figure 1:
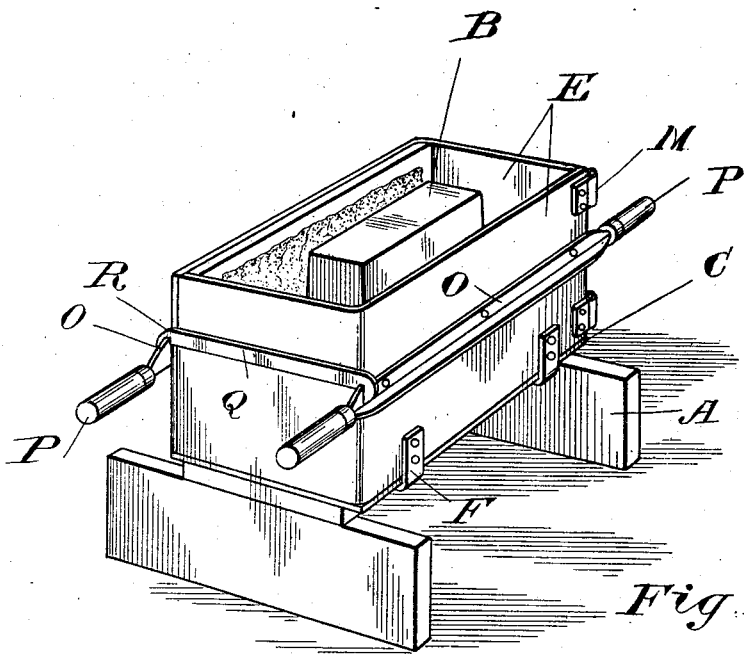
Figure 2:
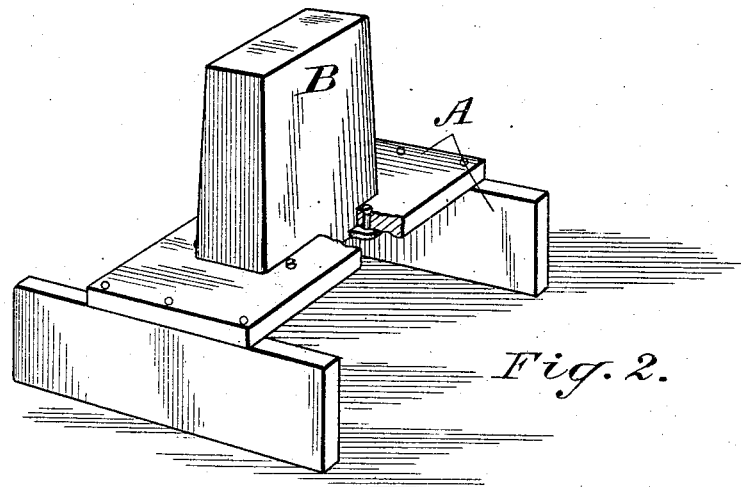

In the drawings, Figure 1 is a perspective view of the complete apparatus. Fig. 2 is a perspective view of the base or bed, showing it fitted with a stationary core to be used in conjunction with the drag for the purpose of forming hollow building-blocks. Fig. 3 is a perspective view of the drag, showing the sections opened to allow the delivery of the molded blocks. Fig. 4 is a perspective view of the follow-board or pallet which forms the detachable bottom for the drag. Fig. 5 is a perspective view of the molded block or stone.

Like letters of reference refer to like parts throughout the specification and drawings.

The molding apparatus consists of a base element A, which may be of any suitable size and shape and which is so constructed as to be easily transportable in order that it can be readily moved from place to place as required during the carrying on of the operations of manufacturing the artificial stone or building blocks. Projecting upwardly from the middle of the base A is a stationary core B, and removably mounted on the base element A is an apertured follow-board or pallet C, through the aperture D of which projects the stationary core B. This follow-board or pallet C constitutes the bottom of the drag E, to which it is detachably connected by means of gripping elements F, secured to the sides of the drag in such a manner that they will detach themselves from the follow-board as the hinged sections G and H composing the drag E are opened to permit of the delivery of the molded contents.

The drag-section G consists of a side member I and an end member J, integrally formed or securely united together, and the drag-section H consists of corresponding side and end members K and L, respectively, the side member K being secured to the end member J by means of hinges M, which while rigidly uniting the sections at one end permit of them being opened to allow of the delivery of the mold contents. Fastened to the outer faces of each of the side members I and K are handle-bars O, which project beyond the end members J and L and are fitted with handgrips P. When the drag-sections G and H are closed together, the locking-bar or locking element Q engages the adjacent end of the handle-bars to rigidly hold the hinged sections in their closed position, this locking bar or locking element Q having at its end hook-shaped catches R to engage the handle-bars O in such a manner that while they enable the locking-bar to hold the sections securely closed they permit of the locking-bar being easily detached from the handle-bars to allow of the opening of the section. During the process of manufacturing the artificial stone the silicious and cementing materials are combined in the proper proportions and thoroughly mixed in a dry state. The mixture is then slightly moistened preparatory to being placed in the mold. The follow-board is then placed on the base element A, with the core B projecting through the aperture D, and the drag-sections are closed together and locked in their closed position by means of the locking elements Q, the gripping elements F being so arranged that they engage the follow-board or pallet E and securely connect it temporarily to the drag. The moistened mixture of sand and cement is then placed in the drag and tamped into a compact homogeneous mass of the requisite density, the mold during the process of tamping forming it into the requisite shape. When the stone has been shaped, the mold, with its molded contents, is lifted clear of the stationary core and carried to the place where the follow-board or pallet and the molded stone or blocks are to be deposited. The locking element is then removed and the drag-sections are opened to disengage the gripping elements from the follow-board or pallet, which, with the molded stone, is deposited where the stone is to be treated to the indurating process. Another follow-board or pallet is then detachably connected to the drag, the sections of which are again securely connected by the locking-bar or locking element Q and placed upon the base element, as above described.

Having thus fully described my invention, what I claim as new, and desire to secure by Letters Patent, is—

1. In a mold for the manufacture of artificial stone the combination of a bottom member, a mold-box therefor consisting of side and end members hinged together and arranged to be opened and closed laterally during the use of the apparatus, grappling members secured to the side members of the mold-box, to engage the bottom members and secure the mold-box thereto when the parts are in their assembled position and a locking device to securely hold the side and end members of the mold-box in their closed position.

2. In a mold for the manufacture of artificial stone the combination of a bottom member, a mold-box therefor consisting of side and end members hinged together and arranged to be opened and closed laterally during the use of the apparatus, grappling members secured to the side members of the mold-box to engage the bottom member and secure the mold-box thereto when the parts are in their assembled position, handles for the side members of the mold-box and a detachable locking-bar arranged to engage the handles and lock the side and end members of the mold-box in their closed position.

3. In a mold for the manufacture of artificial stone the combination of an apertured bottom member, a mold-box therefor consisting of side and end members hinged together and arranged to be opened and closed laterally during the use of the apparatus, grappling members secured to the side members of the mold-box to engage the bottom member and secure the mold-box thereto when the parts are in their assembled position, handles for the side members of the mold-box and a detachable locking-bar arranged to engage the handles and lock the side and end members of the mold-box in their closed position and a core for the base member corresponding to the aperture in the bottom member of the mold.

4. In a mold for the manufacture of artificial stone the combination of a bottom member, a mold-box therefor consisting of side and end members hinged together and arranged to be opened and closed laterally during the use of the apparatus, grappling members secured to the side members of the mold-box to engage the bottom member and secure the mold-box thereto when the parts are in their assembled position, handles for the side members of the mold-box, a detachable locking-bar arranged to engage the handles and lock the side and end members of the mold-box in their closed position and a core for the base member corresponding to the aperture in the bottom member of the mold.

Woodstock, August 5, 1903.

F. W. DUNN.

In presence of—
 H. J. FINKLE,
 C. H. RICHES.